United States Patent [19]

Lotsch et al.

[11] Patent Number: 4,525,591
[45] Date of Patent: Jun. 25, 1985

[54] 2,4-DIOXOTETRAHYDROPYRIMIDO-(1,2-A)-BENZIMIDAZOLE SUBSTITUTED ISOINDOLINE DYES AND THEIR USE

[75] Inventors: Wolfgang Lotsch, Beindersheim; Reinhard Kemper, Heidelberg; Ernst Schefczik, Ludwigshafen, all of Fed. Rep. of Germany

[73] Assignee: BASF Aktiengesellschaft, Ludwigshafen, Fed. Rep. of Germany

[21] Appl. No.: 470,946

[22] Filed: Mar. 1, 1983

[30] Foreign Application Priority Data

Mar. 6, 1982 [DE] Fed. Rep. of Germany ....... 3208218

[51] Int. Cl.³ .................. C07D 487/04; C09B 57/04
[52] U.S. Cl. .............................. 544/250; 544/284; 106/288 Q
[58] Field of Search ........................ 544/250

[56] References Cited

U.S. PATENT DOCUMENTS

| | | | |
|---|---|---|---|
| 3,468,888 | 9/1969 | Chow et al. | 544/250 |
| 3,646,033 | 2/1972 | Leister et al. | 544/250 |
| 4,041,163 | 8/1977 | Bindra et al. | 544/250 |
| 4,096,145 | 6/1978 | Schefczik | 544/250 |
| 4,167,569 | 9/1979 | Mills | 544/250 |
| 4,271,303 | 6/1981 | Vamvakaris et al. | 544/250 |

FOREIGN PATENT DOCUMENTS 1187667 4/1970 United Kingdom .
1379409 1/1975 United Kingdom .

OTHER PUBLICATIONS

Chemical Abstracts, vol. 45, No. 22, 10247–10248, 11/25/1951 de Cat et al., "Heterocyclic Derivatives of Pyrimidobenzimidazoles."

Primary Examiner—Donald G. Daus
Assistant Examiner—S. A. Gibson
Attorney, Agent, or Firm—Oblon, Fisher, Spivak, McClelland & Maier

[57] ABSTRACT

Isoindoline dyes of the formula

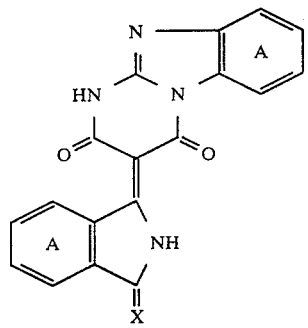

where X is a radical of the formula

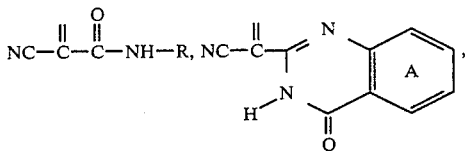

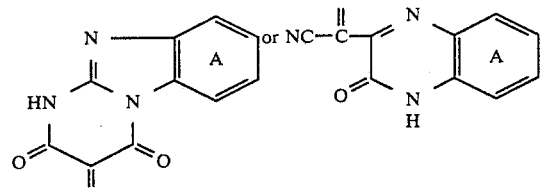

and R is hydrogen, alkyl, benzyl, phenyl, napth-1-yl or a 5-membered or 6-membered unsaturated heterocyclic radical which may or may not be fused to a benzene ring, and the rings A, the phenyl ring, the naphthyl ring and the heterocyclic radical in R are unsubstituted or substituted by non-solubilizing groups, color finishes, printing inks and plastics in deep red or brown hues which are very lightfast and fast to migration.

9 Claims, No Drawings

2,4-DIOXOTETRAHYDROPYRIMIDO-(1,2-A)-BENZIMIDAZOLE SUBSTITUTED ISOINDOLINE DYES AND THEIR USE

BACKGROUND OF THE INVENTION

Field of the Invention

The present invention relates to novel isoindoline dyes and their use.

SUMMARY OF THE INVENTION

The novel isoindoline dyes are of the general formula

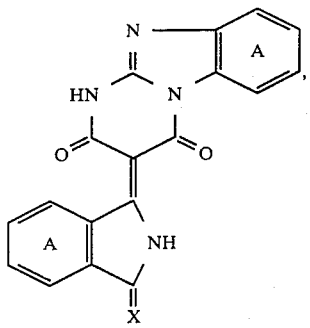

(I)

where X is a radical of the formula

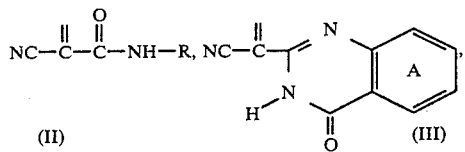

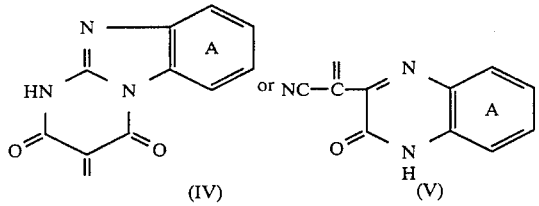

and R is hydrogen, $C_1$–$C_4$-alkyl, benzyl, phenyl, naphth-1-yl or a 5-membered or 6-membered unsaturated heterocyclic radical which may or may not be fused to a benzene ring, and the rings A, the phenyl ring, the naphthyl ring and the heterocyclic radical in R are unsubstituted or substituted by non-solubilizing groups.

The dyes of the formula (I) are useful as color finishes, printing inks and plastics in brown hues, except for the dyes in which R is hydrogen or alkyl, which give orange hues. The colorations are lightfast and fast to migration. Some of the dyes are very weatherfast, and are very useful for pigmenting automotive finishes.

Suitable $C_1$–$C_4$-alkyl radicals R are, for example, N-butyl, isobutyl, sec.-butyl, n-propyl, isopropyl, ethyl and methyl.

R is furthermore a 5-membered or 6-membered unsaturated heterocyclic radical which may or may not be fused to a benzene ring, examples being thiazol-2-yl, benzothiazol-2-yl, 6-methoxybenzothiazol-2-yl and 1,2,4-triazol-3-yl.

The phenyl radicals, the naphthyl radicals and the benzo-fused radicals of the heterocyclic structures, as well as the rings A, can be substituted by non-solubilizing groups.

For the purposes of the invention, non-solubilizing groups (substituents) are those which impart to the dye neither water solubility nor solubility in organic solvents. Examples of such substituents are halogen, alkyl or alkoxy, each of 1 to 6 carbon atoms, nitro, trifluoromethyl, carbamyl, ureido, sulfamyl or cyano; alkoxycarbonyl, alkanoyl, n-alkylcarbamyl, n-alkylureido or alkanoylamino, each of 2 to 6 carbon atoms in total; alkylsulfonyl or alkylsulfamyl, each of 1 to 6 carbon atoms; phenoxycarbonyl, benzoyl, benzoylamino, phenylsulfonyl, n-phenylcarbamyl, n-phenylsulfamyl, phenyl, n-phenylureido or phenylazo, or a fused 5-membered or 6-membered heterocyclic ring which contains a

group in the ring.

Preferred non-solubilizing groups are chlorine, bromine, methyl, ethyl, methoxy and/or ethoxy. The number of these groups can be not more than 3, preferably 0, 1 or 2, in particular 0 or 1.

Among the compounds of the formula (I), those of the formulae, (VI), (VII) and (VIII) are preferred for reasons of color and performance:

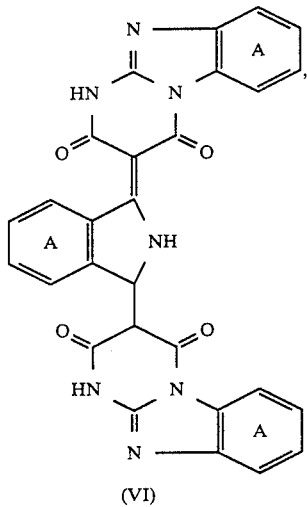

(VI)

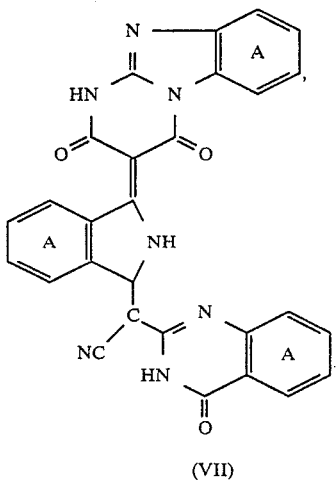

(VII)

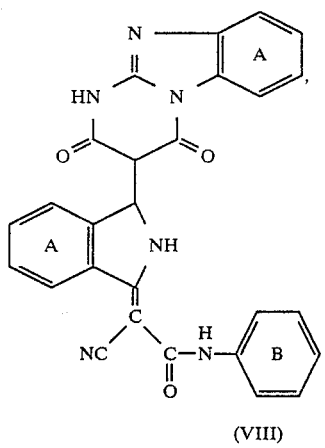

(VIII)

In these formulae, the rings A and B are unsubstituted or substituted by the above non-solubilizing groups, and the number of substituents is not more than 2.

Particularly preferred dyes of the formulae (VI) and (VII) are those in which the rings A are unsubstituted.

Particularly preferred dyes (VIII) are those in which the rings (A) are unsubstituted and the ring B is monosubstituted or disubstituted by chlorine and/or methyl, in particular by chlorine.

The dye of the formula (VI) in which the rings A are unsubstituted is very particularly preferred.

The dyes of the formula (I) are obtained by a conventional process, by stepwise condensation of 1,3-diiminoisoindoline with an appropriate CH-acidic compound.

To prepare the dyes (IN) in which X is a radical of the formula II, III or V, 1,3-diiminoisoindoline is condensed with a compound of the formula

NC—CH$_2$—R$^1$     (VIII), where R$^1$ is

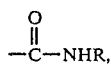
—C—NHR, quinazol-2-yl or quinoxal-2-yl, in the molar ratio 1:1, and the product (a semi-condensation product) of the formula

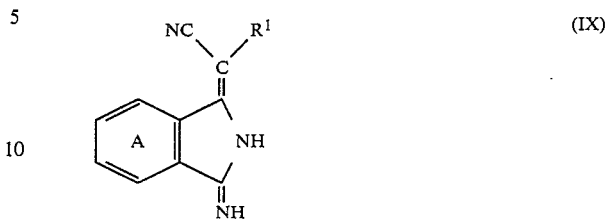

is condensed with an equimolar amount of the compound

(X)

In the formulae, R, R$^1$ and A have the above meanings.

Dyes of the formula I in which X is a radical of the formula IV are obtained by reacting 1,3-diiminoisoindoline with the compound (X) in a molar ratio 1:2.

The condensation of the diiminoisoindoline with the cyanomethylene-active compound of the formula VIII to give the semi-condensation product of the formula IX can be carried out in water or in an organic solvent or diluent, for example an aliphatic alcohol of 1 to 4 carbon atoms, such as methanol, ethanol, isopropanol or butanol, the glycol or glycol ether, an open-chain or cyclic amide, such as dimethylformamide, dimethylacetamide or N-methylpyrrolidone, or in a mixture of the above solvents. A small excess of diiminoisoindoline can be advantageous. The amount of solvent and diluent is not critical, and is determined by the stirrability or miscibility of the reaction mixture. The reaction is carried out as a rule at below 100° C.

The condensation of 1 mole of diiminoisoindoline with 2 moles of a CH-acidic compound of the formula X, or that of the semi-condensation product of the formula IX with the compound of the formula X, is carried out in ani aliphatic monocarboxylic or dicarboxylic acid, in particular an aliphatic monocarboxylic acid, eg. acetic acid or propionic acid, at from 50° to 150° C.

Both the semi-condensation product of the formula IX and the pigment of the formula I are precipitated from the hot solution, and can be isolated in pure form by filtration and, if required, washing with an organic solvent.

By carrying out the reaction in a suitable manner, it is also possible, where X is intended to be a radical of the formula II, III or V, to effect both reaction steps in the same vessel, without intermediate isolation of the semi-condensation product of the formula IX.

The crude products can be generally be used as pigments directly in the form in which they are obtained in the reaction. However, they can also be converted, by a conventional conditioning process, to pigmentary forms which are optimum for their intended use.

The compounds of the formula X, which are 2,4-dioxotetrahydropyrimido-[1,2-a]-benzimidazole compounds, can be prepared from 2-aminobenzimidazole and a malonic acid derivative.

The examples which follow illustrate the invention. Parts and percentages are by weight.

EXAMPLE 1

(a) 20.1 parts of the compound X (in which ring A is unsubstituted) and 10.4 parts of the monoadduct of ethylene glycol with 1,3-diiminoisoindoline, in 250 parts of glacial acetic acid, were stirred at the boil for 3 hours. The mixture was cooled and then filtered, and the precipitate was washed first with glacial acetic acid and then with methanol, and dried. 22 parts of the dye of the formula

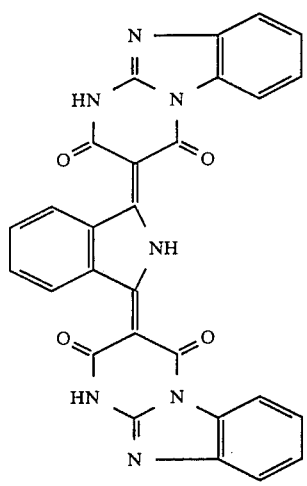

(XI)

were obtained in the form of a brown powder of melting point >360° C.

The dye can be used directly to pigment finishes, printing inks and plastics. Very deep brown colorations which are very lightfast and very fast to overcoating were obtained.

(b) 10 parts of the dye obtained as described in (a) in 100 parts of dimethylformamide were stirred for 3 hours at 130° C. The mixture was cooled, and 9 parts of dye were isolated in a pigmentary form which gave very deep brown colorations of improved lightfastness.

EXAMPLES 2 to 6

The compounds Xa

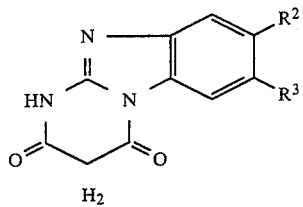

(Xa)

shown in Table (I were reacted with 1,3-diiminoisoindoline by the method described in Example 1(a). Compounds of the formula XIa were obtained.

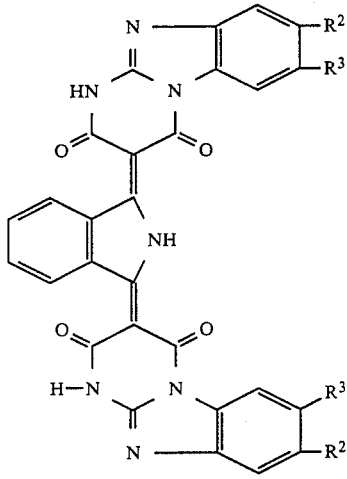

(XIa)

TABLE I

| Example | (Xa) or (XIa) | | Hue | Melting point [°C.] |
| --- | --- | --- | --- | --- |
| | $R^2$ | $R^3$ | | |
| 2 | Mixture of | | brown | >360 |
| | —CH₃ | —H | | |
| | —H | —CH₃ | | |
| 3 | Mixture of | | brown | >360 |
| | —Cl | —H | | |
| | —H | —Cl | | |
| 4 | —Cl | —Cl | brown | >360 |
| 5 | Mixture of | | brown | >360 |
| | —OCH₃ | —H | | |
| | —H | —OCH₃ | | |
| 6 | Mixture of | | brown | >360 |
| | —NH—COCH₃ | —H | | |
| | —H | —NH—COCH₃ | | |

EXAMPLE 7

16 parts of 1:1 reaction product of 1,3-diiminoisoindoline with 2-cyanomethylquinazolone was stirred at the boil with 10 parts of the compound Xa), where $R^2$ and $R^3$ are each H, in 250 parts of glacial acetic acid for 3 hours. The mixture was cooled and then filtered, and the residue was washed with glacial acetic acid and methanol, and dried. 20 parts of the dye of the formula

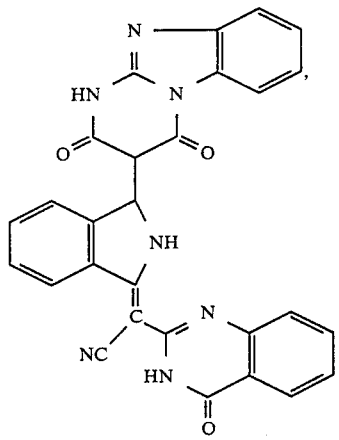

(XII)

were obtained in the form of a brown powder of melting point >360° C. In finishes, printing inks and plastics, the dye gives deep reddish brown colorations which are lightfast and fast to overcoating.

EXAMPLES 8 to 31

A 1:1 reaction product of 1,3-diiminoisoindoline with a compound of the formula $R^1—CH_2—CN$ (VIII) was reacted with a compound of the formula Xa by a method corresponding to that described in Example 7. Compounds of the formula XIII

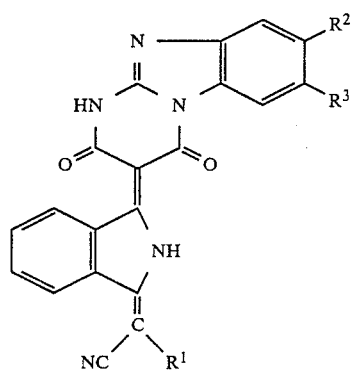
(XIII)

were isolated, $R^1$, $R^2$ and $R^3$ have the meanings shown in Table II, which also shows the hue obtained in finishes using the dye, and the melting point of the dye.

TABLE II

| Example | $R^1$ | $R^2$ | $R^3$ | Hue | Melting point [°C.] |
|---|---|---|---|---|---|
| 8 | (2-acetamidophenyl-imino) | Mixture of —CH₃, —H | —H, —CH₃ | brown | >360 |
| 9 | " | Mixture of —OCH₃, —H | —H, —OCH₃ | brown | >360 |
| 10 | " | —Cl | —Cl | brown | >360 |
| 11 | (2-acetamido-5-chlorophenyl-imino) | —H | —H | brown | >360 |
| 12 | (quinoxalinone) | —H | —H | brown | >360 |
| 13 | " | Mixture of —CH₃, —H | —H, —CH₃ | brown | >360 |
| 14 | " | Mixture of —Cl, —H | —H, —Cl | brown | >360 |
| 15 | (methyl-quinoxalinone (6,7)) | —H | —H | brown | >360 |
| 16 | —C(O)—NH—C₆H₅ | —H | —H | brown | >360 |
| 17 | —C(O)—NH—C₆H₄—Cl | —H | —H | brown | >360 |

TABLE II-continued

| Example | R¹ | R² | R³ | Hue | Melting point [°C.] |
|---|---|---|---|---|---|
| 18 | −C(=O)−NH−(3-chlorophenyl) | −H | −H | brown | >360 |
| 19 | −C(=O)−NH−(4-methylphenyl) | −H | −H | brown | >360 |
| 20 | −C(=O)−NH−(2,4-dimethylphenyl) | −H | −H | brown | >360 |
| 21 | −C(=O)−NH−(4-chloro-3-methylphenyl) | −H | −H | brown | >360 |
| 22 | −C(=O)−NH−(4-chloro-2,5-dimethoxyphenyl) | −H | −H | brown | >360 |
| 23 | −C(=O)−NH−(4-acetamidophenyl) | −H | −H | brown | >360 |
| 24 | −C(=O)−NH−(1H-1,2,4-triazol-3-yl) | −H | −H | brown | >360 |
| 25 | −C(=O)−NH−(1H-benzimidazol-2-yl) | −H | −H | brown | >360 |
| 26 | −C(=O)−NH−(5-methoxybenzothiazol-2-yl) | −H | −H | brown | >360 |
| 27 | −C(=O)−NH₂ | −H | −H | orange | >360 |
| 27 | " | Mixture of −CH₃ / −H | −H / −CH₃ | orange | >360 |
| 25 | " | Mixture of −Cl / −H | −H / −Cl | orange | >360 |
| 30 | " | −Cl | −Cl | orange | >360 |

TABLE II-continued

| Example | R¹ | R² | R³ | Hue | Melting point [°C.] |
|---|---|---|---|---|---|
| 31 | —C(=O)—NHCH₃ | —H | —H | orange | >360 |

USE EXAMPLES

(a) Finish 10 parts of the dye obtained as described in Example 1 and 95 parts of a baking finish mixture, which contains 70% of coconut alkyd resin (60% strength, dissolved in xylene) and 30% of melamine resin (about 55% strength, dissolved in butanol/xylene), are milled in an attrition mill. The mixture is applied, and baked for 30 minutes at 120° C. to give a brown full shade finish which is lightfast and fast to overcoating. When titanium dioxide is admixed to the dye, the brown colorations are obtained as white reductions.

If the dyes described in Examples 2 to 31 are used, the resulting finishes have orange or brown hues and similar properties.

(b) Plastic 0.5 part of the dye obtained as described in Example 1 is applied onto 100 parts of polystyrene granules (standard brand) by tumbling. The colored granules are homogenized by extruding at from 190° to 195° C., and the resulting brown extrudates are lightfast.

If mixtures of 0.5 part of dye and 1 part of titanium dioxide are used, high-hiding, brown colorations are obtained.

If the pigment dyes obtained as described in Examples 2 to 31 are used, similar colorations are obtained.

(c) Printing ink 8 parts of the pigment dye obtained as described in Example 1, 40 parts of a colophony resin modified with phenol/formaldehyde, and from 55 to 65 parts of toluene are mixed thoroughly in a dispersing unit. The brown toluene-based gravure printing ink obtained gives light-fast prints.

We claim:

1. An isoindoline dye of the formula

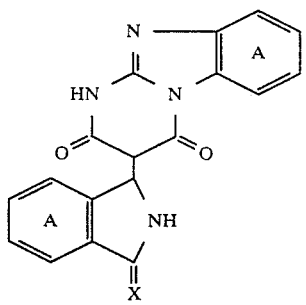

where X is a radical of the formula

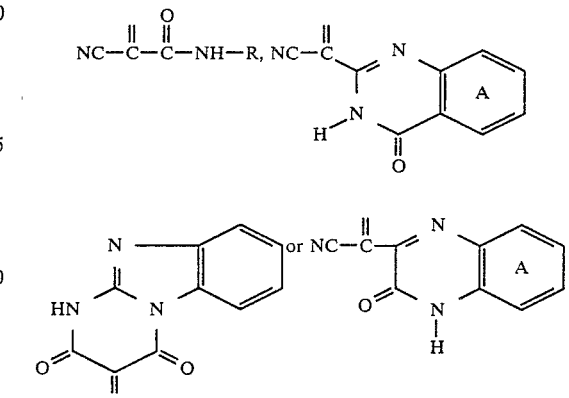

and R is hydrogen, $C_1$–$C_4$-alkyl, benzyl, phenyl, naphthl-yl or a heterocyclic radical, selected from the group consisting of thiazol-2-yl, benzothiazol-2-yl, 6-methoxybenzothiazol-2-yl and 1,2,4-triazol-3-yl and benzimidazol-2-yl and the rings A, the phenyl radical, the naphthyl radical and the heterocyclic radical in R may be further substituted by 1 to 3 non-solubilizing groups selected from the group consisting of halogen, alkyl and alkoxy, each of 1 to 6 carbon atoms, 1 to 2 nitro, trifluoromethyl, carbamyl, ureido, sulfamyl, cyano, alkoxycarbonyl, alkanoyl, n-alkylcarbamyl, n-alkylureido and alkanoylamino, each of 2 to 6 carbon atoms in total, alkylsulfonyl and alkylsulfamyl, each of 1 to 6 carbon atoms, phenoxycarbonyl, benzoyl, benzoylamino, phenylsulfonyl, n-phenylcarbamyl n-phenylsulfamyl, phenyl, and n-phenylureido.

2. An isoindoline dye as claimed in claim 1, wherein, in the formulae, the rings A are unsubstituted or substituted by chloride, bromine, methyl, ethyl, methoxy or ethoxy, where the number of substituents, is 1, 2 or 3, and where there are 2 or more substituents they may be identical or different.

3. An isoindoline dye as claimed in claim 1, wherein, in the formula, the rings A are unsubstituted.

4. An isoindoline dye of the formula

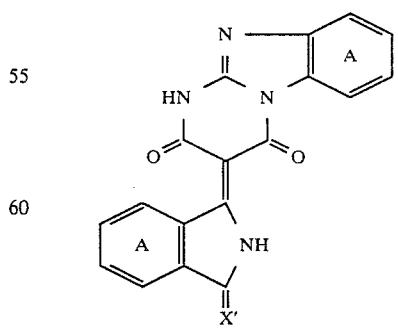

where X' is a radical of the formula

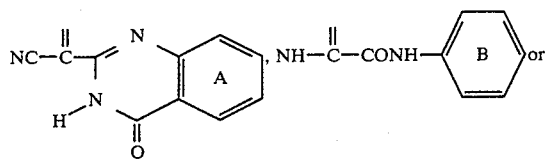

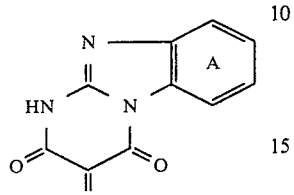

and the rings A and B are unsubstituted or monosubstituted or disubstituted by chlorine, bromine, methyl, ethyl, methoxy or ethoxy, and, where there are two substituents, these can be identical or different.

5. An isoindoline dye as claimed in claim 4, wherein X' is a radical of the formula

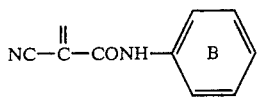

where the phenyl radical B is monosubstituted or disubstituted by chlorine or methyl, and, where there are two substituents, these can be identical or different.

6. An isoindoline dye as claimed in claim 4, wherein the rings A are unsubstituted.

7. An isoindoline dye as claimed in claim 5, wherein the rings A are unsubstituted.

8. An isoindoline dye as claimed in claim 5, wherein the rings A are unsubstituted and the ring B is substituted by a chlorine atom.

9. An isoindoline dye of the formula

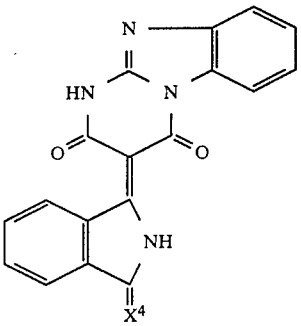

where X'' is

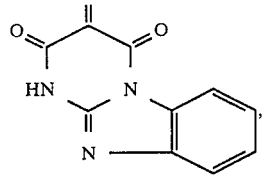

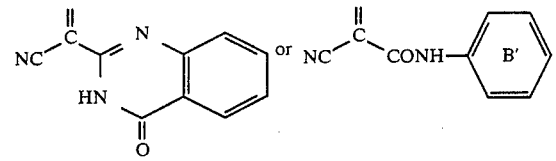

and the ring B' is substituted in the 3-position or 4-position by chlorine.

* * * * *